US012416537B2

(12) United States Patent
Mastinu et al.

(10) Patent No.: US 12,416,537 B2
(45) Date of Patent: Sep. 16, 2025

(54) HUB CARRIER COMPRISING FORCE AND/OR MOMENT SENSORS (71) Applicant: POLITECNICO DI MILANO, Milan (IT)

(72) Inventors: Gianpiero Mastinu, Cernobbio (IT); Massimiliano Gobbi, Pavia (IT); Federico Maria Ballo, Terni (IT)

(73) Assignee: POLITECNICO DI MILANO, Milan (IT)

( * ) Notice: Subject to any disclaimer, the term of this patent is extended or adjusted under 35 U.S.C. 154(b) by 340 days.

(21) Appl. No.: 17/760,117

(22) PCT Filed: Feb. 10, 2021

(86) PCT No.: PCT/EP2021/053120
§ 371 (c)(1),
(2) Date: Aug. 4, 2022

(87) PCT Pub. No.: WO2021/160629
PCT Pub. Date: Aug. 19, 2021

(65) Prior Publication Data
US 2023/0044489 A1 Feb. 9, 2023

(30) Foreign Application Priority Data
Feb. 12, 2020 (IT) .................. 102020000002773

(51) Int. Cl.
*G01L 5/1627* (2020.01)
*B60G 3/20* (2006.01)
(Continued)

(52) U.S. Cl.
CPC ............ *G01L 5/1627* (2020.01); *B60G 3/20* (2013.01); *B62D 7/18* (2013.01); *G01L 1/2231* (2013.01);
(Continued)

(58) Field of Classification Search
CPC ....... G01L 5/1627; G01L 1/2231; G01L 3/22; G01L 5/04; G01L 5/161; G01M 17/02;
(Continued)

(56) References Cited

U.S. PATENT DOCUMENTS

| 7,669,941 B2 | 3/2010 | Al et al. |
| 7,779,705 B2 | 8/2010 | Mastinu et al. |

(Continued)

FOREIGN PATENT DOCUMENTS

| EP | 1886849 A1 | 2/2008 |
| FR | 2588957 A1 | 4/1987 |

(Continued)

OTHER PUBLICATIONS

International Search Report and Written Opinion for Corresponding International Application No. PCT/EP2021/053120, 10 pages, Apr. 29, 2021.

*Primary Examiner* — Benjamin R Schmitt
(74) *Attorney, Agent, or Firm* — LUCAS & MERCANTI, LLP (57) ABSTRACT A hub carrier is provided having: a central part for carrying a hub for a wheel of a vehicle; an outer frame adapted to connect the hub carrier to a suspension of the vehicle; at least three spokes interposed between the central part and the outer frame, the at least three spokes being rigidly connected to the central part. The at least three spokes have respective end elements connected to the outer frame and provide respective sliding spherical hinges for the at least three spokes. The hub carrier further includes at least three sensors configured for detecting force and/or moment components acting on the hub.

13 Claims, 6 Drawing Sheets (51) Int. Cl.
*B62D 7/18* (2006.01)
*G01L 1/22* (2006.01)
*G01L 3/22* (2006.01)
*G01L 5/04* (2006.01)
*G01M 17/02* (2006.01)

(52) U.S. Cl.
CPC ................. *G01L 3/22* (2013.01); *G01L 5/04* (2013.01); *G01M 17/02* (2013.01); *B60G 2204/11* (2013.01); *B60G 2206/50* (2013.01)

(58) Field of Classification Search
CPC .. B60G 3/20; B60G 2204/11; B60G 2206/50; B62D 7/18
See application file for complete search history.

(56) References Cited

U.S. PATENT DOCUMENTS

| | | | | |
|---|---|---|---|---|
| 2003/0145651 A1* | 8/2003 | Hofmann | ............ | B60T 13/662 |
| | | | | 73/146 |
| 2009/0173170 A1* | 7/2009 | Mastinu | .................... | G01L 3/22 |
| | | | | 403/113 |

FOREIGN PATENT DOCUMENTS

| | | | | |
|---|---|---|---|---|
| FR | 2861335 A1 * | 4/2005 | ........... | B60G 11/113 |
| JP | S51-133270 | * 10/1977 | ............... | G01L 5/16 |
| JP | S52133270 A | 11/1977 | | |
| WO | 2005015146 A1 | 2/2005 | | |

\* cited by examiner

HUB CARRIER COMPRISING FORCE AND/OR MOMENT SENSORS

CROSS-REFERENCE TO RELATED APPLICATIONS

This application is a 371 of PCT/EP2021/053120, filed Feb. 10, 2021, which claims the benefit of Italian Patent Application No. 102020000002773, filed Feb. 12, 2020.

TECHNICAL FIELD

The present invention relates to a hub carrier comprising force and/or moment sensors, i.e. a sensorized hub carrier.

In general, the present invention concerns measuring forces and moments acting in sub-units of a vehicle, which allows, among other things, implementing control logics and different functions.

In particular, the present invention proposes an innovative technical solution for measuring the forces and moments acting at a hub of vehicles, in particular road vehicles.

BACKGROUND OF THE INVENTION

Measuring the forces and moments acting on elements of vehicles, in particular of the wheel-suspension assembly, is of great interest in the automotive field.

In fact, the forces exchanged between the tyre and the road strongly influence the features of the road vehicles in terms of handling, comfort, and safety.

U.S. Pat. No. 7,779,705 B2 relates to a device for the detection of forces and moments acting on a wheel. This device configuration allows forces and moments to be measured, but it is difficult to implement with regard to the transmission of the signals from the sensors, which are mounted on a rotating moving wheel, to the control unit. In fact, the presence of a moving wheel obliges to use wireless sensors, which require batteries. Moreover, in this device configuration, the presence of a moving wheel obliges the wheel angular position to be continuously measured to define suitable references for the measured forces.

U.S. Pat. No. 7,669,941 B2 relates to a wheel end with a housing and a hub engaging in the housing, by coupling of a wheel. The intensity of the forces and moments acting on the hub and transferred to the suspension are measured by deformation sensors mounted on the housing connections. This wheel end configuration allows forces and moments to be measured, but accuracy and efficacy could be largely improved. Moreover, this wheel end configuration is not able to measure forces acting on the hub, in consequence to braking actions on the wheel.

SUMMARY OF THE INVENTION

The object of the present invention is to remedy drawbacks of the prior art.

A further particular object of the present invention is to improve the accuracy in measuring forces and moments acting on a hub of a wheel of a vehicle.

A further particular object of the present invention is to measure forces and moments acting on a hub in a more effective way with respect to the prior art.

A further particular object of the present invention is to measure forces and moments acting on the hub, even in consequence to braking actions on the wheel.

A further particular object of the present invention is to propose a system for measuring forces and moments acting on the hub which has a particular efficacy of use.

These and other objects are achieved by a hub carrier according to the features of the attached claims, which form an integral part of the present description.

An idea underlying the present invention is to provide a hub carrier comprising a central part for carrying a hub for a wheel of a vehicle; an outer frame adapted to connect the hub carrier to a suspension of the vehicle; at least three spokes interposed between the central part and the outer frame. The at least three spokes are rigidly connected to the central part, and comprise respective end elements connected to the outer frame which provide respective sliding spherical hinges for the at least three spokes. The hub carrier further comprises at least three sensors configured for detecting force and/or moment components acting on the hub.

The hub carrier according to the present invention allows forces and/or moments acting on the hub to be accurately measured.

It becomes thereby possible to improve the development of control systems, which are even more effective in ensuring the active safety of the vehicle, in particular for self-driving and connected vehicles.

Moreover, it becomes possible to also improve the structural safety of the wheel-suspension system into which the hub carrier according to the present invention is inserted.

In general, the hub carrier equipped with sensors of the present invention is able to derive, starting from the measure of deformations in certain points of the structure, the three force components and the moments acting on the hub of the vehicle. Advantageously, the hub carrier of the present invention represents a sensitive element with a structure having three or more spokes, joined to an outer frame by constraints which provide sliding spherical hinges, preferably sliding in an axial direction with respect to the longitudinal axis of the spokes.

Elastic elements can be associated with these sliding spherical hinges. These sliding spherical hinges are thereby embodied by linear or rotational springs. Preferably, these sliding spherical hinges can be made by one or more leafs, or by elastomer supports. The use of elastomer supports is suited to make a further suspension stage of the vehicle, to the benefit of the performances regarding "Noise Vibration Harshness" (NVH).

Moreover, advantageously, the hub carrier according to the present invention is based on a structure of the isostatic or quasi-isostatic type, for measuring the loads (forces and moments) acting on the wheel hub. The use of an isostatic or quasi-isostatic structure allows considerable advantages to be obtained, in terms of higher measure accuracy and lower sensitivity to external noise factors, such as for example thermal gradients or displacements of the constraints which affect the vehicle system.

Advantageously, the present invention allows providing an accurate measure of the loads acting on the bearing (or bearings) of the hub carrier: it is possible to measure up to three forces and up to three moments, among which the wheel rolling resistance one.

Still advantageously, the information on the loads acting on the bearing (or bearings) of the hub carrier derived according to the present invention, allows improving stability and driveability characteristics of a vehicle, also by instant communication with the driver and/or by report in a testing step. Moreover, this information allows active safety systems to be implemented, in terms both of maintenance and of control, as well as partially automated systems which communicate the vehicle parameters to the driver, and fully automated systems for self-driving vehicles.

Further features and advantages will be more apparent from the following detailed description, of preferred non-limiting embodiments of the present invention, and from the dependent claims which outline preferred and particularly advantageous embodiments of the invention.

BRIEF DESCRIPTION OF THE DRAWINGS

The invention is illustrated with reference to the following figures, given by way of non-limiting examples, in which.

In the different figures, similar elements will be identified by similar reference numbers.

In a same figure, even in the presence of more elements of the same type, only one of them will be sometimes indicated for clarity of representation, it being understood that also the other elements of the same type are encompassed in the discussion.

DETAILED DESCRIPTION

Figure 1:
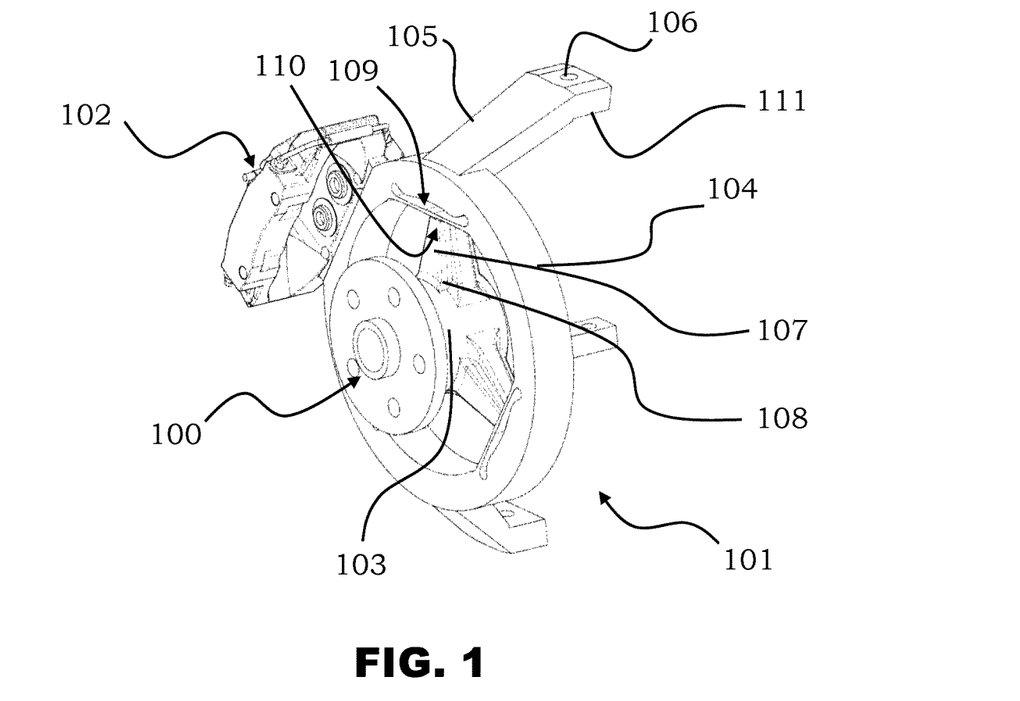
FIG. 1 illustrates a system comprising a hub, a hub carrier according to the present invention and a brake caliper.

FIG. 1 illustrates a system comprising a hub 100, a hub carrier 101 according to the present invention and a brake caliper 102.

In the present description "hub carrier" means a structure in which one or more bearings are housed, that is fitted, to support the hub of a wheel. The hub carrier, as understood in the present invention, constitutes the generally vertical structure (that is a part of the structure), called upright of the (independent) suspension of mostly, but not exclusively, road vehicles. The shape of the hub carrier can involve a housing for one or more bearings, that is it can involve a spindle for fitting one or more bearings.

The term "hub" in the present description, indicates an assembly also comprising the corresponding bearings, typically rolling support bearings, although not shown for simplicity in the figures.

The hub carrier 101 according to the present invention replaces, in a vehicle, a conventional hub carrier or spindle as an element of a suspension upright.

The hub carrier 101 comprises a central part 103 into which the hub 100 is inserted. Moreover, the hub carrier 101 comprises an outer frame 104, adapted to connect the hub carrier 101 to a suspension of a vehicle (not shown).

Preferably, the connection of the outer frame 104 to a suspension is provided by one or more junction elements 105. In this embodiment, the three junction elements 105 are made integral with the outer frame 104.

In this example, the junction elements 105 provide a substantially bracket-like conformation, sloping towards the connection provided, with respective holes 106 at an end portion 111, opposite said integral connection with the outer frame 104, for the connection to the suspension.

Nothing prevents the provision of a different conformation of the described junction elements 105, likewise nothing prevents the adoption of a connection between the hub carrier 101 and a vehicle suspension which does not provide the use of said junction elements 105.

Moreover, the hub carrier 101 comprises at least three spokes 107, which are rigidly connected to the central part 103 at an inner end 108 thereof.

The at least three spokes 107 further comprise respective end elements 109 at an outer end 110 opposite the inner end 108.

As it will be further described, the end elements 109 are connected to the outer frame 104 and provide respective sliding spherical hinges for the at least three spokes 107.

The sliding spherical hinges are configured for allowing sliding movements of each of these end elements 109 at least in an axial direction with respect to the at least three spokes 107 respectively, and further for allowing spatial rotations of each of the end elements 109.

Figure 2:
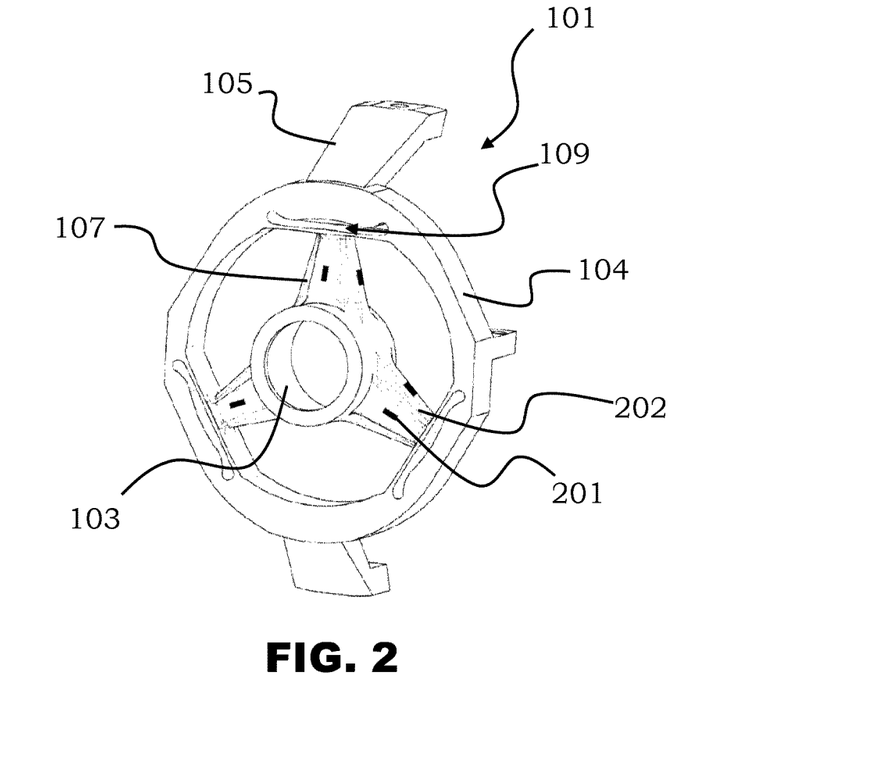
FIG. 2 illustrates a first embodiment of a hub carrier according to the present invention, to which sensors are applied.

As it can be seen in FIG. 2, the hub carrier 101 according to the present invention further comprises at least three sensors 201, preferably more than three, configured for detecting force and/or moment components acting on the hub 100.

Preferably, the at least three sensors 201 are respectively located on a body 202 of the at least three spokes 107. More preferably, the at least three sensors 201 are respectively located on the four side surfaces of each of the at least three spokes 107.

Alternatively, it is possible to provide that the at least three sensors 201 are respectively located at the end elements 109, this choice not affecting the quality of the detection carried out by the sensors 201.

In the represented embodiments, the spokes 107 provide a substantially truncated-pyramid-like shape, with recesses obtained at the side corners. However, nothing prevents the provision of spokes 107 having different shapes. Furthermore, nothing prevents the provision of spokes 107 composed of a plurality of separated elements which originate from the central part 103 and merge in the same end element 109.

In the preferred embodiment, the at least three spokes 107 are mutually arranged at angles of 120°, this configuration proving to be optimal in order to obtain the information related to the forces and moments to which the hub carrier 101 is subjected.

For a correct detection by the sensors 201, the outer frame 104 must be stiff enough. "Stiff enough" means that the outer frame 104 must provide a structure which withstands the stresses and longitudinal and transversal loads without significantly deforming compared to the spokes 107 and end elements 109, thus allowing a correct detection of the bending deformation required instead by the spokes 107 and/or end elements 109.

As a matter of fact, the forces and moments acting in the middle of the hub carrier 101 are just derived from the deformation measured for the spokes 107 and/or end elements 109.

In particular, in the represented exemplary configuration, it is possible to measure the three forces acting on the hub carrier 101 along the horizontal, transversal and vertical directions respectively, and the moments acting on the hub carrier 101 around the longitudinal and vertical axis.

For this purpose, the signals of the deformation sensors 201 are suitably processed so as to trace the values of the forces and moments acting on the hub carrier 101.

The processing of the signals of the sensors 201 depends on the configuration adopted for the latter, in particular on the arrangement thereof in the structure of the hub carrier 101. The person skilled in the art is thus able to determine the suitable processing modes based on the configuration adopted for the sensors 201. The person skilled in the art, in particular, can avail himself of the help of the methods for measuring forces and moments described in the patent publications WO2005015146A1 and WO2007135551A2, for example.

Figure 3:
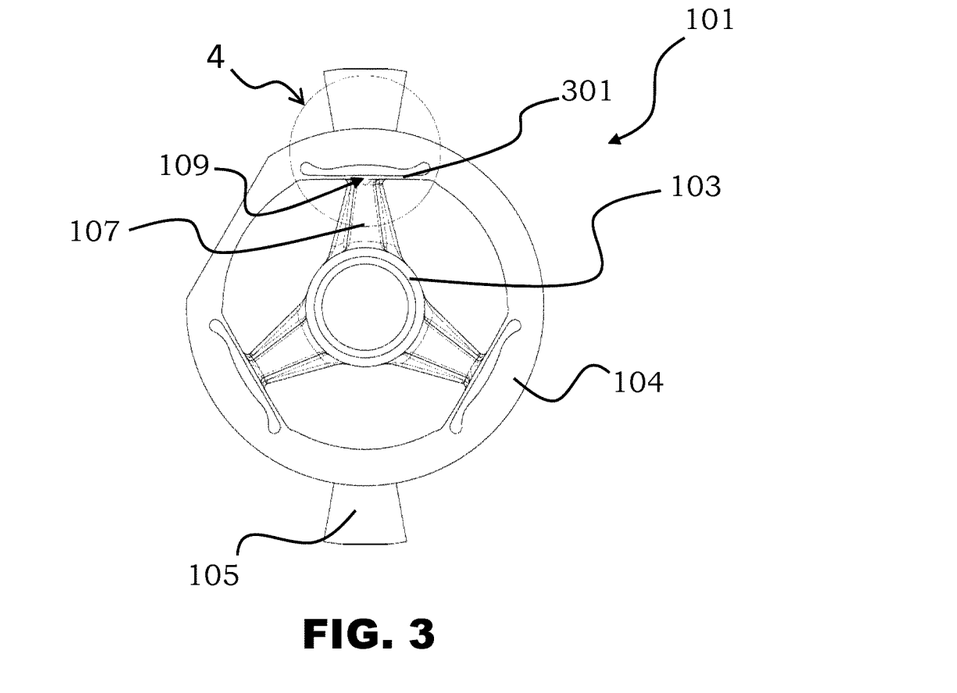
FIG. 3 illustrates a front view of the hub carrier of FIG. 2.
Figure 4:
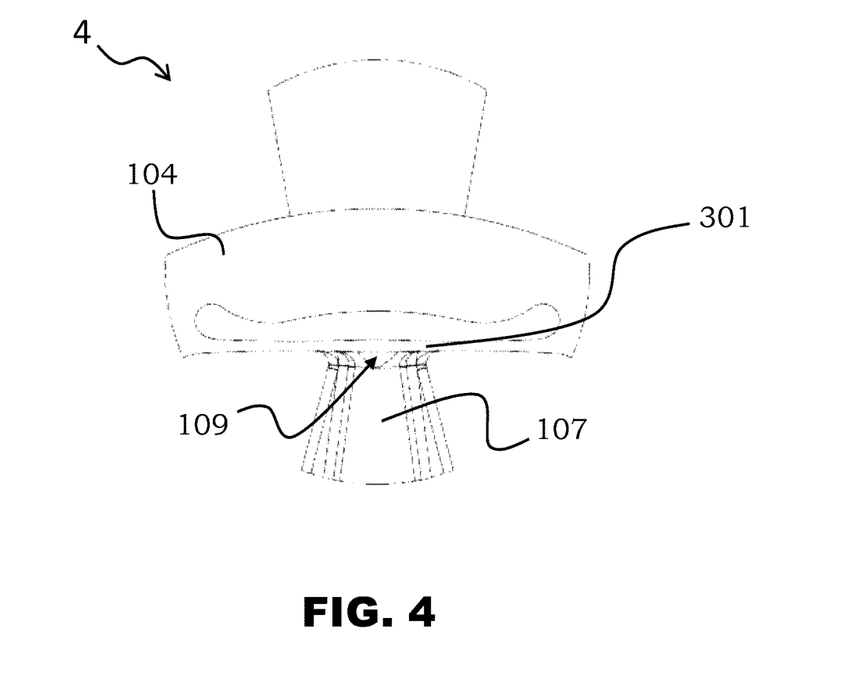
FIG. 4 illustrates a detailed view of an elastic leaf joint of the hub carrier of FIG. 3.

FIG. 3 illustrates a front view of the hub carrier 101 and FIG. 4 illustrates a specific detail 4 thereof.

In this preferred embodiment of the invention, at least one of the end elements 109, preferably all the end elements 109, comprises an elastic leaf joint 301, this leaf being transversally arranged with respect to a longitudinal axis of one of the at least three spokes 107.

Preferably the at least one elastic leaf joint 301 is obtained in the structure of the hub carrier 101, in particular in the outer frame 104. The at least one elastic leaf joint 301 provides a stiffness along the axis of the spoke 107 which is lower than the stiffnesses along the other two orthogonal directions.

The elastic leaf joint 301 thus provides an extension in the elastic articulation plane, a plane which is perpendicular to the longitudinal axis of the relative spoke 107.

Preferably, the at least three sensors 201 already described comprise at least one deformation sensor, still preferably a strain gauge.

In this case, with at least one of the at least three sensors 201 located at the relative end element 109, the six stress quantities are directly measurable by the constrain reactions acting in a lateral direction and in a longitudinal direction on the elastic leaf joint 301.

As an alternative or in combination, the at least three sensors 201 comprise at least one displacement sensor, preferably a piezoelectric element.

Instead in this case, always with at least one of the at least three sensors 201 located at the relative end element 109, from the six measures it is possible to univocally derive a force vector F resolved into three vectors directed along three Cartesian axes and a moment vector P resolved into three vectors directed along three Cartesian axes, i.e. the six generalized forces acting on the body 202 of the three spokes 107.

These examples have merely a non-limiting illustrating nature of the configurations of the invention.

Figure 5:
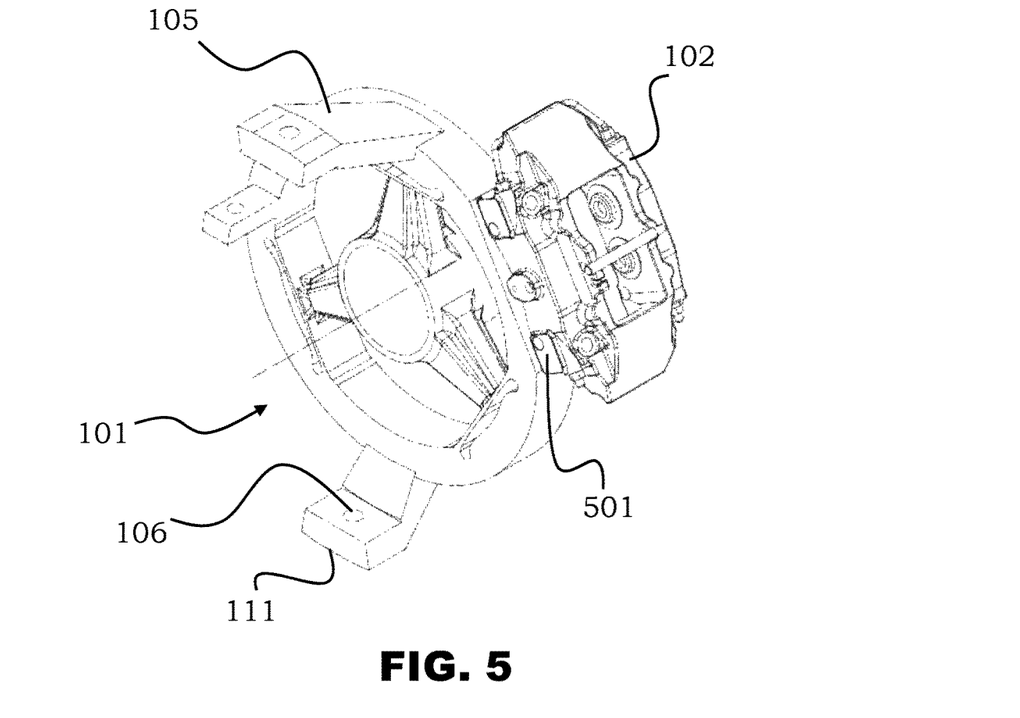
FIG. 5 illustrates a second embodiment of a hub carrier according to the present invention, with which a brake caliper is associated.
Figure 6:
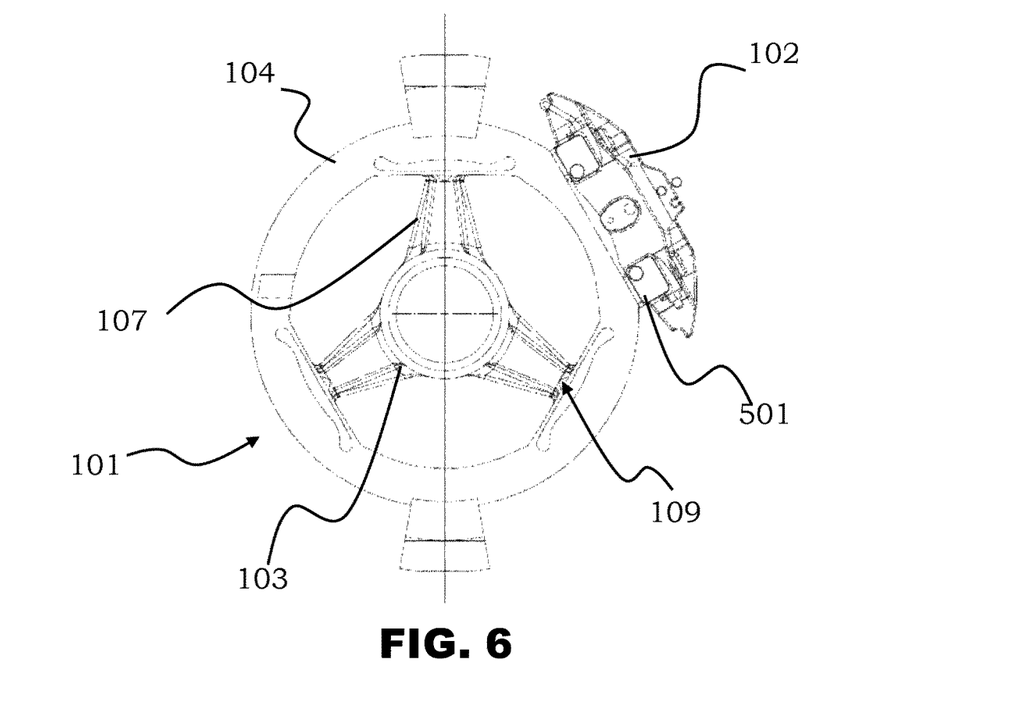
FIG. 6 illustrates a front view of the hub carrier of FIG. 5.

FIG. 5 and FIG. 6 illustrate a second embodiment of a hub carrier 101 according to the present invention, in a perspective view and in a front view respectively, with which a brake caliper 102 is associated.

In particular, it is highlighted how the outer frame 104 further comprises an attachment 501 for the brake caliper 102.

The positioning of the brake caliper 102 at the outer frame 104 involves a potential reduction of the mass of the whole assembly of the hub carrier 101 and brake caliper 102.

The hub carrier 101, and more particularly the outer frame 104, generally takes an annular conformation, for a greater structural simplicity. However, nothing prevents the adoption of different conformations, for example triangular, hexagonal, or other shapes.

Figure 7:
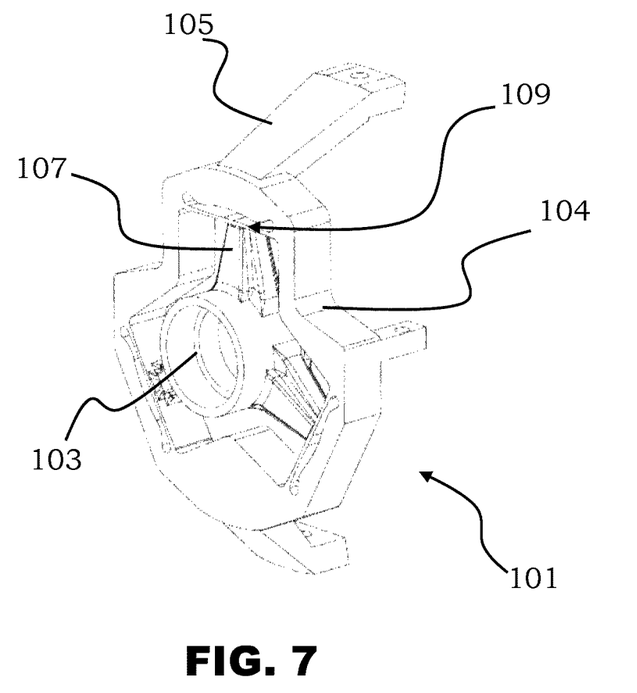
FIG. 7 illustrates a third embodiment of a hub carrier according to the present invention.

As a matter of fact, FIG. 7 illustrates a third embodiment of a hub carrier according to the present invention, wherein the outer frame 104 provides a segmented conformation according to the distribution of the spokes 107, a conformation which ensures furthermore an optimization of the quantity of material required for creating it without affecting the operation of the hub carrier 101 itself.

Figure 8:
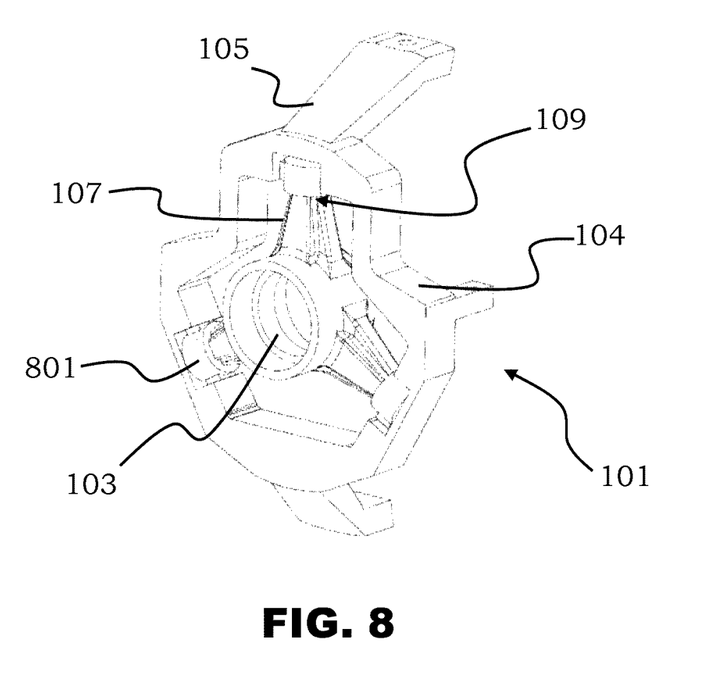
FIG. 8 illustrates an alternative of the third embodiment of a hub carrier according to the present invention, in which the end elements of the spokes are modified.

FIG. 8 illustrates an alternative of the third embodiment of a hub carrier 101 according to the present invention, wherein the end elements 109 of the spokes 107 are modified, that is sliding spherical hinges with which suitable elastic elements are associated.

In fact, instead of the above-described elastic leaf joints 301, at least one of these end elements 109 comprises a bushing 801, preferably of elastomeric material or polytetrafluoroethylene, or other elastic material.

Preferably, the adopted bushings 801 are made so as to have a very reduced clearance and friction, especially in the case that the sliding spherical hinge is made with a ball joint and sleeve. Moreover, further leafs undergoing a bending could be adopted inside the bushings 801.

Obviously, nothing prevents the use of the solution with bushings 801 in an annular or still otherwise shaped configuration of the outer frame 104.

Figure 9:
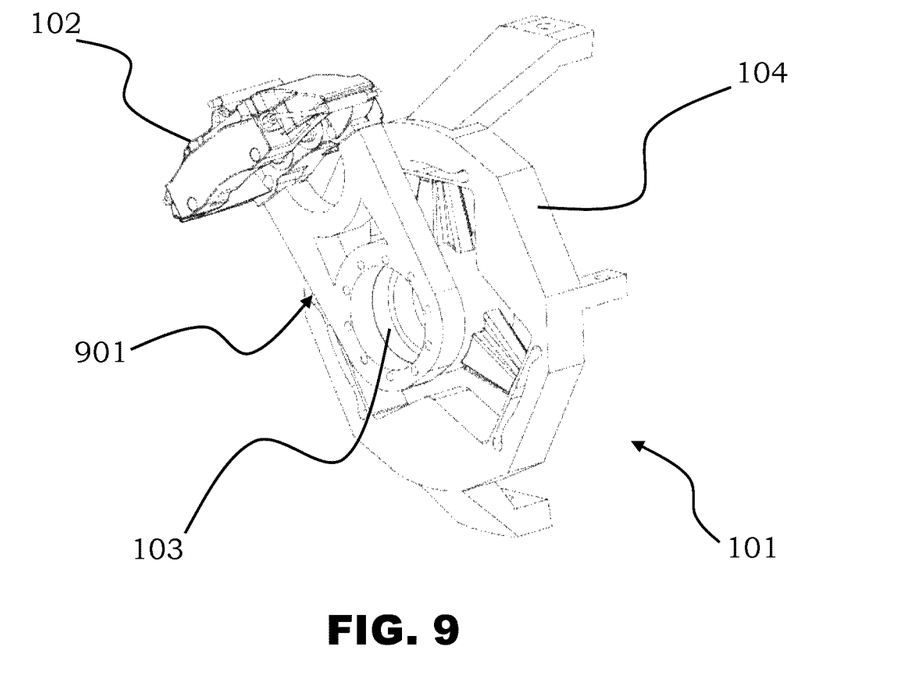
FIG. 9 illustrates a fourth embodiment of a hub carrier according to the present invention, with which a brake caliper is associated.

FIG. 9 illustrates a fourth embodiment of a hub carrier 101 according to the present invention, with which a brake caliper 102 is associated.

Specifically, the hub carrier 101 further provides a connection element 901 constrained to the central part 103 and separated from the outer frame 104. In this specific embodiment, the attachment 501 for the brake caliper 102 is provided on the connection element 901.

By constraining the brake caliper 102 at the central part 103 rather than on the outer frame 104, at the expense of a minimum increase in the overall weight due to the connection element 901, it is possible to measure, through the at least three sensors 201, also the braking moment generatable by the brake caliper 102, besides the five force and moment components already mentioned above.

The knowledge of the braking moment allows a more complete overview of the forces involved on the hub and tyre to be obtained.

Figure 10:
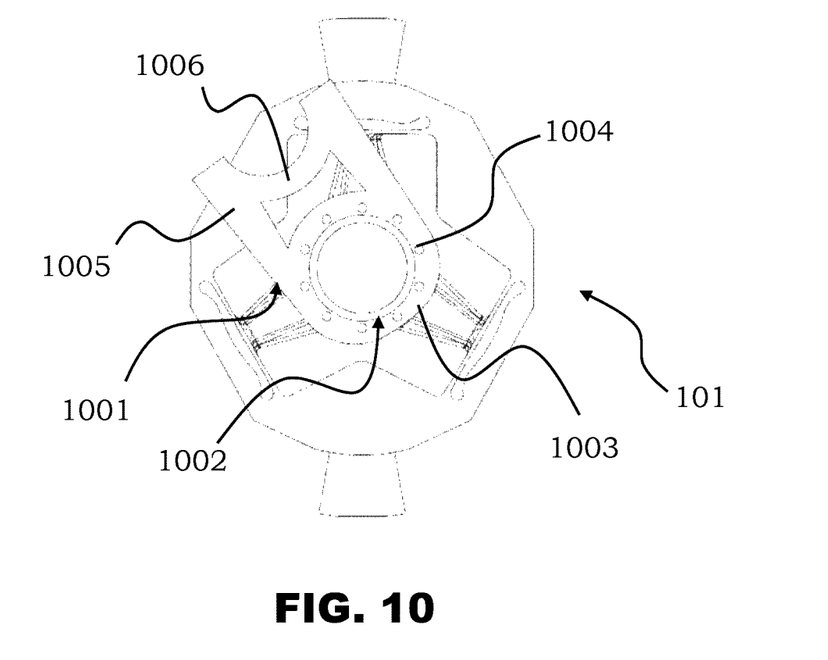
FIG. 10 illustrates a front view of the hub carrier of FIG. 9, in which the brake caliper is omitted.

FIG. 10 illustrates a front view of the hub carrier 101 of FIG. 9, in which the brake caliper is omitted.

Specifically, it is possible to appreciate how the connection element 901, in the present exemplary embodiment, provides an arched structure 1001, having a coupling element 1002 for the central part 103 at the curved portion 1003 of the arched structure 1001. The coupling element 1002 is connected by a plurality of bolts 1004 in a concentrical manner and overlapping the periphery of the central part 103, and thus around the hub 100 inserted into the central part 103. The vertical elements 1005 of the arched structure 1001 are further connected by a reinforcement element 1006 comprised between these vertical elements 1005. Obviously, the present embodiment does not represent the only possible solution, being it possible to appraise different solutions also depending on the requirements of the specific case.

Figure 11:
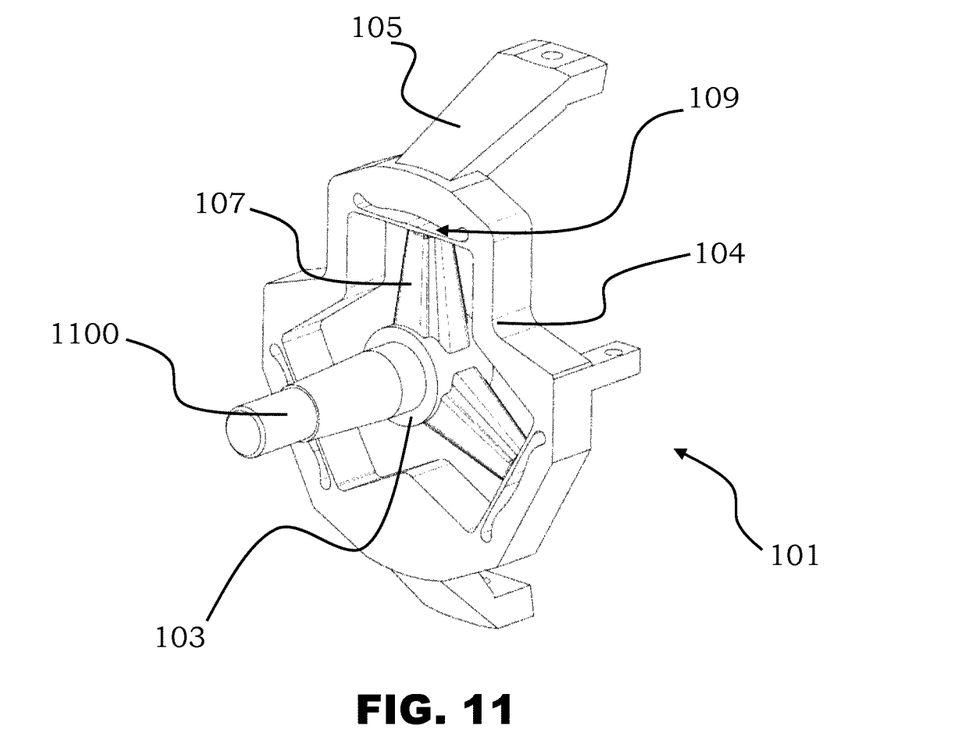
FIG. 11 illustrates a fifth embodiment of a hub carrier according to the present invention, with a spindle.

FIG. 11 illustrates a view of a fifth embodiment of a hub carrier 101 according to the present invention, with a spindle 1100.

This structural arrangement is alternative to the above-presented one, and it is composed of a hub carrier 101 composed of a spindle 1100 connected to the at least three spokes 107 interposed between the spindle 1100 itself and the outer frame 104.

In particular, the hub carrier 101 provides a central part 103 composed of the spindle 1100, in which the spindle 1100 is configured for fitting one or more bearings of a hub of a wheel of a vehicle.

In general, according to the present invention, the structure which is sensitive to the forces and moments is composed of the above hub carrier 101 with the at least three spokes 107, or of the spindle 1100 with the at least three spokes.

INDUSTRIAL APPLICABILITY

The present invention allows monitoring and control of the forces and moments acting on a wheel of a vehicle to be obtained, in particular, but not solely, for any vehicle with independent suspensions, yet more preferably quadrilateral suspensions.

The hub carrier according to the present invention can be adopted, as a target market, in the field of the motorsport, being it necessary to accurately check the even significant variations of forces and moments acting on the hub, in order to optimize the design thereof and furthermore ensure that more and more stringent safety parameters are met.

A further field of application of the present invention can be that of the so-called "supercars", i.e. of road vehicles with high performances, which have similar monitoring needs given the high standards required.

Still further, the hub carrier according to the present invention can find a useful application in the more and more developed self-driving vehicles. In fact, the knowledge of the force and moment components at the hub can be combined to a control box, thus ensuring a continuous control and a possible start of a warning procedure in the event of a detection regarded as critical.

Taking into consideration the here reported description, the person skilled in the art will be able to devise further modifications and alternatives, in order to meet contingent and specific requirements.

For example, the hub carrier according to the present invention can be adopted for the detection of the desired force and moment components even in the presence of braking systems of different types with respect to the above-described ones, being it a system not depending on the braking actuation source.

The here-described embodiments must therefore be understood as illustrative and non-limiting examples of the invention.

The invention claimed is:

1. A hub carrier comprising:
a central part for carrying a hub for a wheel of a vehicle;
an outer frame for connecting said hub carrier to a suspension of said vehicle;
at least three spokes interposed between said central part and said outer frame,
said at least three spokes being rigidly connected to said central part,
said at least three spokes comprising respective end elements connected to said outer frame and providing respective sliding spherical hinges for said at least three spokes;
said hub carrier further comprising at least three sensors configured for detecting force and moment components acting on said hub.

2. The hub carrier according to claim 1, wherein said at least three sensors are respectively located at said end elements and/or are respectively located on a body of said at least three spokes.

3. The hub carrier according to claim 2, wherein said at least three sensors comprise at least one deformation sensor.

4. The hub carrier according to claim 2, wherein said at least three sensors comprise at least one displacement sensor.

5. The hub carrier according to claim 1, wherein at least one of said end elements comprises a bushing of elastomeric material and/or polytetrafluoroethylene and/or other elastic material.

6. The hub carrier according to claim 1, wherein at least one of said end elements comprises an elastic leaf joint, a leaf of said elastic leaf joint being transversally arranged with respect to a longitudinal axis of one of said at least three spokes.

7. The hub carrier according to claim 1, wherein said sliding spherical hinges are configured for allowing sliding movements of each of said end elements at least in an axial direction with respect to said at least three spokes respectively, and further configured for allowing spatial rotations of each of said end elements.

8. The hub carrier according to claim 1, wherein said outer frame further comprises an attachment for a brake caliper.

9. The hub carrier according to claim 1, further comprising a connection element constrained to said central part and separated from said outer frame, said connection element further comprising an attachment for a brake caliper.

10. The hub carrier according to claim 9, wherein said connection element is configured for transmitting to said central part a braking moment generatable by said brake caliper and detectable by said at least three sensors.

11. The hub carrier according to claim 1, further comprising one or more junction elements adapted to connect said outer frame to said suspension.

12. The hub carrier according to claim 1, wherein said at least three spokes are mutually arranged at angles of 120°.

13. The hub carrier according to claim 1, wherein said central part is composed of a spindle configured for fitting one or more bearings of a hub.

* * * * *